United States Patent [19]

Vodiunig et al.

[11] Patent Number: 5,178,810
[45] Date of Patent: Jan. 12, 1993

[54] PROCESS FOR PRODUCING FLAME RETARDANT HIGH TEMPERATURE RESISTANT SHAPED ARTICLES

[75] Inventors: Robert Vodiunig, Leoben; Norbert Rossak, Neukirchen a.d. Vöckla; Manfred Schobesberger, Seewalchen; Klaus Weinrotter, Vöcklabruck, all of Austria

[73] Assignee: Lenzing Aktiengesellschaft, Lenzing, Austria

[21] Appl. No.: 502,182

[22] Filed: Mar. 30, 1990

[30] Foreign Application Priority Data

Apr. 13, 1989 [AT] Austria .................................. 878/89

[51] Int. Cl.$^5$ .............................................. B29C 43/02
[52] U.S. Cl. ...................................... 264/126; 264/113; 264/324; 264/331.12
[58] Field of Search ............... 264/113, 126, 258, 324, 264/331.12

[56] References Cited

U.S. PATENT DOCUMENTS

| | | | |
|---|---|---|---|
| 3,286,008 | 11/1966 | Power et al. ........................ | 264/126 |
| 3,985,934 | 10/1976 | Farrissey, Jr. et al. ............. | 264/210 |
| 4,271,116 | 6/1981 | Jones .................................... | 264/324 |
| 4,613,473 | 9/1986 | Layden et al. ...................... | 264/324 |
| 4,752,355 | 6/1988 | Provost ................................ | 162/123 |
| 5,043,128 | 8/1991 | Umeda ................................ | 264/324 |

FOREIGN PATENT DOCUMENTS 2442203 4/1975 Fed. Rep. of Germany .

OTHER PUBLICATIONS

Chemical Abstracts 86:156997s.
Chemical Abstracts 89:25685c.

*Primary Examiner*—James Lowe
*Attorney, Agent, or Firm*—Kenyon & Kenyon

[57] ABSTRACT

A process for producing high-temperature resistant and flame-retardant shaped articles of polyimide polymers of the general formula

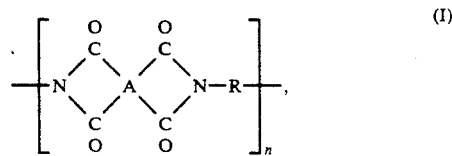

wherein A represents a four-valent group and R represents a divalent aromatic group, by heating a manipulatable sheet-like structure to a temperature in the glass transition range of between 280° C. and 360° and pressing it at pressures ranging between 10 bar and 500 bar. The polyimide shaped bodies obtained have densities of at least 1.30 g/cm$^3$. Preferably, they may be completed as sheets having uniform thicknesses of between 0.1 and 6 mm.

5 Claims, 1 Drawing Sheet

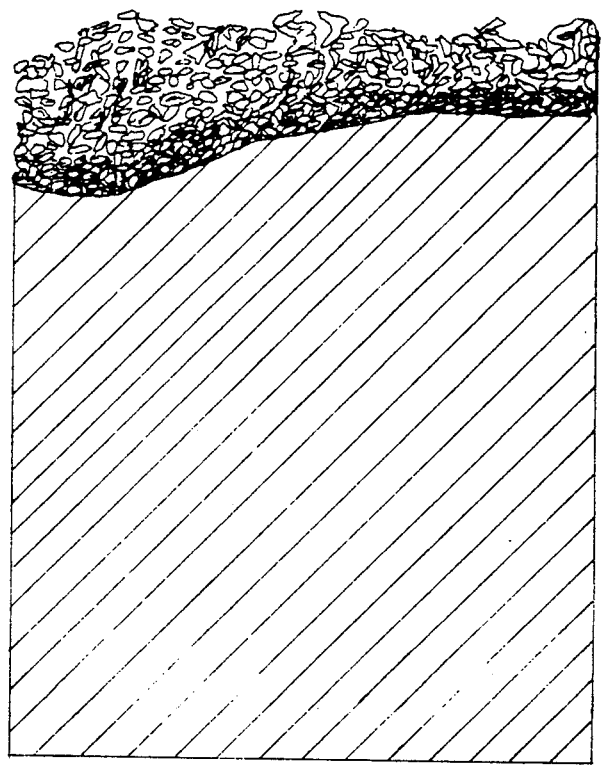

PROCESS FOR PRODUCING FLAME RETARDANT HIGH TEMPERATURE RESISTANT SHAPED ARTICLES

The invention relates to flame-retardant, high-temperature resistant shaped articles made of polyimides as well as to a process for producing the same.

Aromatic polyimides are highly advanced synthetics, i.e., on account of their high thermostability and their flame retardancy. However, therir processing to semi-finished or finished products frequently is difficult. Although plastically deformable at temperatures in the glass transition range, they ar frequently not meltable. If the polymer is obtained in a completely imidized form the manufacture of shaped articles, such as films or boards, is only possible via a polyimide solution or from a polyimide powder.

Films can be produced only by casting a solution of the polymer is a highly polar solvent. Such a method is known from EP-A-0 064 813. However, with this method it is impossible to cast films of any desired thickness, as the solvent must be removed from the film, which can be done to a certain film thickness only. Solvent residues remaining in the film may deteriorate its thermostability considerably.

The processing of polyimide powder is also largely limited. According to the process described by B. H. Lee in "Modern Plastic Encyclopedia 1988", page 62, the polyimide powder is sintered at a high temperature and under pressure, which sometimes necessitates the manufacture of preshaped bodies. The production of boards having small thickness yields very poor results with this process, since it is impossible to spread polyimide powder uniformly over large areas if the powder height is small. Moreover, the handling of pulverized polyimide powder is rendered difficult by the development of dust.

For the reasons state above, the hiterto known polyimide shaped articles having film thicknesses ranging from some tenths of millimeters to some millimeters have proved unsatisfactory with regard to their thermal and mechanical properties.

The invention aims at avoiding these disadvantages and consists in providing flame-retardant, hgh-temperature resistant shaped articles based on polyimide fibers of the general formula

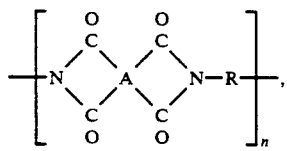

wherein n is an integer larger than 1 and A represents a four-valent aromatic group selected from

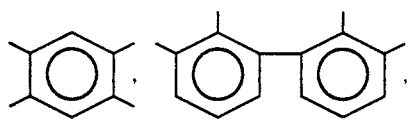

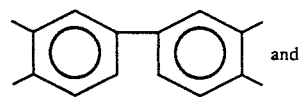

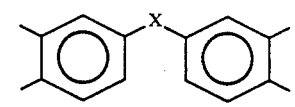

wherein X is CO, $CH_2$, O, S or $CF_2$ and R represents at least one of the following divalent aromatic groups selected from

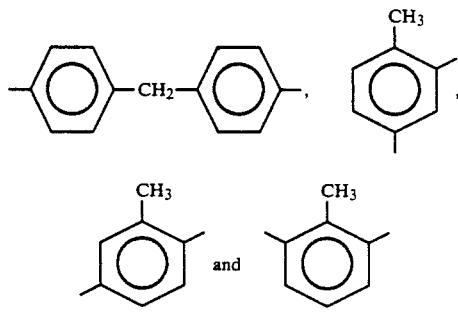

in which X is as defined above, which shaped articles have a density of at lest 1.30 $g/cm^3$.

The shaped articles according to the invention may be made as sheets having uniform thicknesses of between 0.1 mm and 6 mm.

Further properties of the shaped articles according to the invention may be:
a tensile strength of between 50 and 200 $N/mm^2$,
a bending strength of up to 160 $N/mm^2$, and
a modulus of elasticity of up to 3200 $N/mm^2$.

The shaped articles according to the invention may be produced in that a manipulatable sheet-like structure of polyimide fibers of the general formula

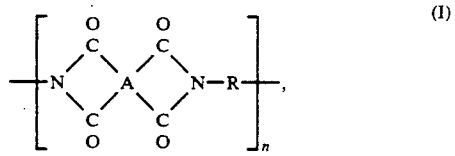

wherein n, A and R have the meanings indicated hereinbefore, is heated to a temperaturein the glass transition range of between 280° C. and 360° C., preferably between 310° C. and 360° C., and is formed at a pressure of between 10 bar and 500 bar, preferably between 100 bar and 350 bar.

Polyimide fibers of the type mentioned may, for instance, be produced by the process described in Austrian Patent Application A 495/88 and processed to form sheet-like structures, such as nonwovens, needle felts or other fiber composites.

Such a fiber composite is plastically deformable at temperatures in the glass transition range, developing a high shrinkage force.

The invention is based on the knowledge that fibers at that state will sinter under the simultaneous application f a pressure of at least 10 bar, the fiber composite thus consolidating to a high degree, which results in a compact and nearly homogenous shaped article exhibiting the properties pointed out above.

The outer appearance of the shaped article according to the invention no longer resembles that of a fiber structure. For instance, a polyimide sheet according to the invention appears transparent and of redbrown color up to a thickness of about 2 mm. Individual fibers are practically unrecognizable even under the microscope.

The drawing shows a cut of a sawn sheet according to the invention eightly times enlarged, whose upper edge region deliberately has been pressed insufficiently. In this region, individual fiber cross sections are still clearly apparent, whereas, within the sheet, the polyimide fibers have already fused to a nearly homogenous mass on account of the high pressure applied.

It has proved suitable to press the fiber composite for a period of time ranging between 1 and 50 minutes, the optimum pressing time being chosen as a function of the thickness of the pressed article. If pressing is effected as too low a temperature or for too short a period of time, merely paperlike, paperboardlike or leather-like structures will be formed.

A big advantage of the process according to the invention over known polyimide powder sintering resides in that a fiber comosite is more readily manipulatable than powder. Moreover, it is possible to produce considerably thinner sheets than has been feasible by the powder technique. Besides, these sheets are uniformly thick.

An advantageous embodiment of the process accordnig to the invention consists in that multi-layer nonwovens and/or multi-layer needle felts may be used as manipulatable sheet-like structures, preferably in the heat-treated state. It has proved that even in such a case a compact and homogeneous material is formed by pressing.

The polyimide fiber composite can be pressed on hot calenders into sheets according to the invention in a simple manner. The finished sheets retain their plasticity at temperatures in the glass transition range and, therefore, can be further processed as semifinished products by known shaping techniques, such as deep-drawing or vacuum deep-drawing. This will be accomplished even if the fiber composite has already been heated several times to temperatures in the glass transition range. This variant of the process according to the invention has the advantage that possibly present low-molecular emittable components are removed from the fibers before the shaped article according to the invention is actually pressure-shaped. In contrast, the drying of polyimide powder is feasible only be expensive operations.

The invention will be explained in more detail by way of the following examples. In all the examples, hmogenous materials were obtained whose properties are summarized in Table 1.

EXAMPLE 1

A thermally treated polyimide fiber needle felt having a thickness of 5 mm and heated to 340° C. for 15 minutes, and two layers of polyimide fiber needle felt having a weight per unit area of 90 g/m$^2$ were laid one above the other. The total weight was 15.4 g. For pressing, a heated 2-platen press at a maximum locking pressure of 90 tons was used. In order to facilitate removal from the mold, the smoothed press platens had been sprayed with a mold release.

A first, the layered material was prepressed at 20 bar for 10 min and at 60 bar for 20 min, at a platen temperature of 350° C., in order to achieve thorough heating up. After this, it was pressed at 100 bar for 10 min. Subsequently, theplaten temperature was lowered to 180° C. within further 10 min, the pressing pressure of 100 bars being maintained. Finally, the sheet was removed from the mold.

EXAMPLE 2

Layered material as described in Example 1 was used as starting material, preheated in a circulating-hot-air cabinet for 30 min at 250° C. prior to pressing.

After 5 minutes of prepressing at 70 bar, pressing was performed at 100 bar for 10 min at a platen temperature of 350° C. After this, the platen temperature was lowered to 180° C. within further 10 min, the pressure of 100 bar being maintained. Subsequently, the sheet was removed from the mold.

Although pressing was performed over a shorter period of time than in Example 1, a product having a higher density and a higher tensile strength was obtianed. THis effect is attributed to preheating the layered material.

The electric and dielectric properties of the sheet obtained are summarized in Table 2. The resistance values were measured at a frequency of 1 MHz.

EXAMPLE 3

A polyimide fiber needle felt thermally treated at 340° C. for 15 min was cut into strips having a width of 15 mm and a length of 100 mm. The thickness was 4 mm. Subsequently, the needle felt strips were preheated to 250° C. in a circulating-hot-air cabinet, superimposed in eight layers and pressed to a special shape. The tool temperature amounted to 350° C.

In order to ehat up, prepressing was initially performed at 70 bar for 5 min, final pressing having occurred at 160 bar for 20 min at 350° C. Subsequently, it was cooled to 180° C. for 10 min, a pressing pressure of 70 bar being maintained.

EXAMPle 4

A polyimide fiber needle felt thermally treated at 340° C. for 15 min and having a thickness of 5 mm and a density of 0.30 g/cm$^3$ was pressed at 350° C. for 30 min., at 160 bar. The fiber had a Tg of 334° C. The linear expansion coefficient α was $5 \times 10^{-5}[K^{-1}]$. Further data are to be taken from Table 1.

EXAMPLE 5

Three layers of polyimide fiber cloth and two layers of thermally treated polyimide fiber needle felt each having a thickness of 5 mm and a density of 0.30 g/cm$^3$ were preheated to 250° C. for 30 min. The cloth and the needle felts were laid one above the other and pressed at 340° C. and 350 bar for 20 min.

The fiber had a Tg of 323° C. The linear expansion coefficient α was $5.2 \times 10^{-5} k^{-1}]$. Further data are to be taken from Table 1.

The shaped articles according to the invention exhibit excellent mechanical, electrical and dielectric properties and may, therefore, be used in electrical engineering as printed circuit-boards and insulating boards.

Because of their tribologic, mechanical and thermal properties, they may also be used in machine construction as bearing cups, starter discs, common bearings, housings or coverings.

Further applications include aircraft construction, for instance, fairings in passenger spaces, as well as cryogenics and high-vacuum technology.

TABLE 1

| Example | Density [g/cm$^3$] | Thickness | Tensile strength [N/mm$^2$]* | Elongation at break [%] | Flexural strength** [N/mm$^2$] | Flex-Modulus of elasticity [N/mmm$^2$]*** |
|---|---|---|---|---|---|---|
| 1 | 1.30 | 1.0 | 60 | 5 | — | — |
| 2 | 1.33 | 1.0 | 80 | 5 | — | — |
| 3 | 1.36 | 5.5 | 100 | 5 | 150 | 3000 |
| 4 | 1.36 | 1.0 | 100 | 5 | 160 | 3200 |
| 5 | 1.36 | 2.0 | 130 | 6 | — | — |

*measured on the basis of DIN 53 455
**according to DIN 53 452
***according to DIN 53 457

TABLE 2

| Measurement No. | Temperature °C. | Dielectric loss factor | Surface resistance Ω | Volume resistance Ωcm | εR |
|---|---|---|---|---|---|
| 1. | 20 | 0.0071 | 2 × 10$^{10}$ | 3 × 10$^{13}$ | 3.4 |
| 2. | 40 | 0.0223 | 8 × 10$^9$ | 7 × 10$^{11}$ | 4.4 |
| 3. | 20 | 0.0168 | 2 × 10$^{11}$ | 1 × 10$^{14}$ | 4.22 |
| 4. | 150 | 0.0043 | 9 × 10$^{10}$ | 2 × 10$^{11}$ | 3.26 |
| 5. | 20 | 0.0019 | 1 × 10$^{12}$ | 3 × 10$^{14}$ | 3.64 |

Measurement No. 1: Initial measurements at room temperature
Measurement No. 2: after 96 hours storage at 40° C. and 92% air moisture
Measurement No. 3: after 16 hours storage at room temperature
Measurement No. 4: after 4 hours storage at 150° C.
Measurement No. 5: after cooling to room temperature
All measurements were carried out in the order indicated, starting with 1.

What we claim is:

1. A process for producing flame-retardant high-temperature resistant shaped articles, comprising providing a manipulatable sheet-like structure based on polyimide fibers of the general formula

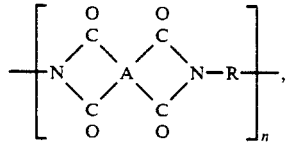

wherein n is an integer greater than 1 and A represents a four-valent aromatic group selected from the group consisting of

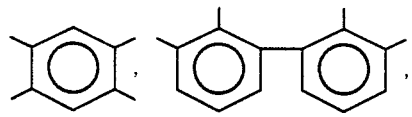

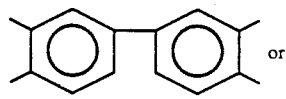

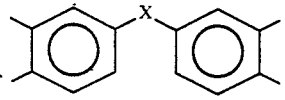

in which x is selected from the group consisting of CO, CH$_2$, O, S, and CF$_2$ and R comprises at least one of the following divalent aromatic group selected from the group consisting of

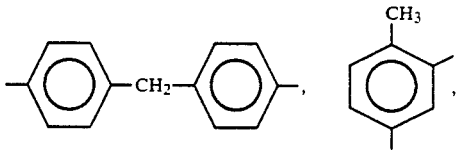

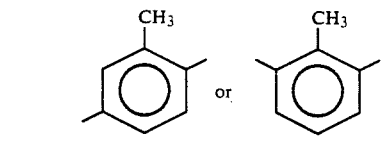

heating said sheet-like structure to a temperature in the glass transition range of between 280° C. and 360° C. so as to obtain a heated sheet-like structure, and pressing said heated sheet-like structure at a pressure ranging between 10 bar and 500 bar by using a shaping means for a time sufficient to sinter said structure.

2. A process as set forth in claim 1, wherein said sheet-like structure is heated to a temperature of between 310° C. and 360° C. and said heated sheet-like structure is pressed at a pressure ranging between 100 bar and 350 bar.

3. A process as set forth in claim 1, wherein said manipulatable sheet-like structure comprise at least one member selected from the group consisting of multi-layer nonwovens and multi-layer needle felts.

4. A process as set forth in claim 3, wherein said manipulatable sheet-like structures have been heat-treated.

5. A process as set forth in claim 1, further comprising preheating said manipulatable sheet-like structure prior to pressing.

* * * * *